United States Patent

[11] 3,602,209

[72] Inventor Fritz Bocker
       34, Bahnhofstrasse, 4703, Bonen, Westphalia, Germany
[21] Appl. No. 745,216
[22] Filed July 16, 1968
[45] Patented Aug. 31, 1971

[54] DRESSING TOOL FOR FORMING AND DRESSING HELICALLY RIBBED GRINDING WHEELS
6 Claims, 5 Drawing Figs.

[52] U.S. Cl. ........................................... 125/11 R, 51/206 P, 51/287
[51] Int. Cl. .......................................... B24b 53/06, B24b 1/00
[50] Field of Search ............................ 51/206.3, 287; 125/11, 39

[56] References Cited
UNITED STATES PATENTS

| | | | |
|---|---|---|---|
| 2,260,593 | 10/1941 | Wittlinger | 76/WC |
| 2,776,529 | 1/1957 | Osplack | 125/11 X |
| 2,824,556 | 2/1958 | Bateman | 125/11 |
| 1,759,333 | 5/1930 | Wildhaber | 51/206 |
| 2,482,785 | 9/1949 | Lohutko | 125/11 |

Primary Examiner—Harold D. Whitehead
Attorney—Markva, Smith & Kruger

ABSTRACT: The invention provides a dressing tool for and a method of forming and dressing helically ribbed grinding wheels for grinding the tooth flanks of spur gears and other profiles that can be generated by rolling, wherein at least the tooth flanks which form the working surfaces of the dressing tool are provided with diamonds embedded in a matrix, and the addendum of the teeth of the dressing tool is about 1.2 x $m$ and the dedendum is about 1.4 x $m$, whereas the addendum of a gearwheel that is to be ground is about 1.0 x $m$ and the dedendum is about 1.2 x $m$, $m$ being the module of the dressing tool and of the gear wheel that is to be ground with the helically ribbed grinding wheel.

Inventor:
FRITZ BÖCKER

PATENTED AUG 31 1971          3,602,209

Inventor:
FRITZ BÖCKER
Lowry, Rinehart & Nelson

DRESSING TOOL FOR FORMING AND DRESSING HELICALLY RIBBED GRINDING WHEELS

BACKGROUND OF THE INVENTION

The invention relates to a dressing tool for forming and dressing helically ribbed grinding wheels for grinding the tooth flanks of spur gears and other profiles that can be generated by rolling such as cycloidal gear teeth or splined shafts.

A known method of grinding the tooth flanks of spur gears consists in using cylindrical helically ribbed grinding wheels with rack tooth profiles. It is also known that the profile of a helically ribbed grinding wheel can be dressed with one or more diamonds which cooperate with the rotating wheel, and which are guided to generate the profile that is to be dressed. It is also known to form and/or dress helically ribbed grinding wheels with a diamond on a revolving disc which is traversed across the revolving grinding wheel. Irrespectively as to whether a single point or a gearwheel-shaped dressing tool is used, its sharp cutting edges cooperate with the grinding wheel and detach individual particles from the surface of the ribs on the wheel.

Forming and/or dressing helically ribbed grinding wheels by the generating principle with a single-point tool is intended to accelerate machining compared with a tool shaped like a gearwheel. However, a single-point tool has the defect that it is incapable of producing a constant pitch thread on the wheel because it generates a different, namely a smaller, pitch on the major diameter than on the minor diameter of the helical rib. This is due to the fact that during the infeed of the profiled tooth towards the wheel that is to be dressed, the one-sided cutting thrust acting on the tooth causes the latter as well as the gear train to be elastically deflected contrary to the direction of rotation, said deflection being in the opposite direction when the tooth is withdrawn from the work. This circumstance modifies the pitch of the helical gearwheel that is being dressed in an undesirable manner, resulting in faulty work because only the outer portions of the ribs of such grinding wheels actually grind.

On the other hand, when the profile is formed with the cutting edges of a steel wheel errors on the surface of the grinding wheel are produced by back lash in the same way as during hobbing. Moreover, a forming and dressing process using a steel wheel can be performed only at a speed which is considerably lower than the grinding speed.

SUMMARY OF THE INVENTION

In order to avoid the shortcomings of conventional dressing processes, the present invention proposes to provide a dressing tool in the form of a spur gear for the production and dressing of helically ribbed grinding wheels for grinding the tooth flanks of spur gears and other profiles that can be generated by rolling, wherein at east the tooth flanks which form the working surfaces of the dressing tool are provided with diamonds embedded in a matrix.

In such a tool, contrary to conventional tools in which the edges have the machining action, it is the tooth flanks that act on the ribs of the grinding wheel. The position of the dressing tool in relation to the ribbed grinding wheel is the same as that between the ribbed grinding wheel and the gearwheel that is to be ground. Since the forces acting on the operative tooth flanks are symmetrical, lateral deflection, as in the case of a single-point tool, cannot occur. Since edges are not involved in the dressing action there is also no back lash. The surface of the helically ribbed grinding wheel therefore remains free from irregularities due to the presence of back lash. The dressing of a preshaped helically ribbed grinding wheel and the formation of the profiles in a grinding wheel blank can be performed at the same speed as that conventional in grinding processes based on the generating principle. Compared with conventional tools the proposed tool therefore has a considerably longer life and the dressing or forming time is very much reduced.

During the entire forming and dressing operation the driving gear train is evenly loaded and the adverse effect of backlash between the wheels of the gear train and of elastic flexure in the coupling between the work and the workholding spindle when the load varies and the torque is reversed are therefore absent. Consequently the proposed tool permits helically ribbed grinding wheels which have a very precisely pitched thread to be produced. Such wheels will then ensure high accuracy in the generation of the tooth flanks on the gearwheels they grind. At the same time any possible error in individual flanks of the dressing wheel can be corrected by the corresponding flanks of the following tooth, and the helically ribbed grinding wheel will therefore be better shaped and dressed than could have been expected from the action of a single tooth flank of the dressing tool. The greater accuracy of its helical ribs incidentally improves the working life of the grinding wheel. Since the proposed dressing tool has an effect on the grinding wheel which resembles the machining action of grinding, the grinding wheel is also more accurate than a grinding wheel that has been trued and dressed by the removal of particles with a sharp cutting edge.

In order to permit the dressing tool to be produced as cheaply as possible, the diamonds or particles of diamond grit are preferably statistically, i.e. randomly, distributed over the tooth flanks. This naturally means that their distribution on consecutive tooth flanks facing the same way will be different. A random distribution and the consequent overlap in the action of the diamonds reduces the roughness of the surface of the grinding wheel which is therefore capable of grinding a high quality surface on gear wheels. The gear trains containing such gear wheels will run exceptionally smoothly.

In an alternative embodiment of the invention, particularly in dressing tools which have a small number of teeth, it is proposed to distribute the diamonds on the tooth flanks in a geometrically defined pattern instead of in random distribution and in such a way that the pattern is staggered on each consecutive tooth flank in relation to the preceding tooth flank facing the same way. This distribution makes for economy in the use of the diamonds.

According to another feature of the invention it is proposed to provide the bottom of the space between consecutive teeth as well as the crests of the teeth of the dressing tool with diamonds and also to make the addendum of the teeth of the dressing tool as well as the dedendum greater than in the gear wheel the dressed grinding wheel is intended to grind. When the helically ribbed grinding wheel has been dressed by the dressing tool the base circle can be corrected with a diamond-armed disc. Experience has shown that in a suitable dimensional relationship the addendum of the teeth of the dressing tool may be about $1.2 \times m$ and the dedendum about $1.4 \times m$ if the addendum of the gearwheel that is to be ground is about $1.0 \times m$ and the dedendum about $1.2 \times m$, "$m$" being the module of the dressing tool and of the gearwheel that is to be ground with the dressed grinding wheel. For reasons that will be explained these dimensions provide considerable advantages over conventional dressing tools and methods of dressing helically ribbed grinding wheels.

If the dressing tool is a gearwheel which by virtue of the greater addendum and dedendum circles of its teeth is about 1.5 mm. smaller at the roots and about 0.5 mm. larger at the crests——corresponding to a module of $m=2.5$ mm.—than a normal gearwheel that is to be ground with the dressed helically ribbed wheel, then the ribs on this wheel will be ground to a greater depth than would actually be necessary and this ensures that the wheel will abrade only the blanks of the gear teeth that are to be ground. The above-mentioned deviations therefore have the advantage that the crests of the teeth and the bottom of the space between the teeth of the ground work will not be included in the grinding action. The ground gearwheel will not therefore be machined in those areas which are not directly in mating contact in use. Besides this fact the arrangement and the method proposed by the present invention have the further advantage that the helically ribbed grinding wheel will not itself be as highly loaded as would be the case if the depth of the threads were not in excess of what would strictly be necessary.

Furthermore, wear of the dressing tool has a diminished effect upon the accuracy of the gearwheel that is to be ground.

The helically ribbed grinding wheel is preferably dressed at exactly the same speed as that used for grinding the gearwheel. If the dressing tool is axially reciprocated across the wheel as when dressing the grinding wheel of a plain grinding machine—the grain of the helically ribbed wheel will be cut and not broken out as is the case in conventional generating tools. Another useful circumstance is that owing to the large number of diamond chips that are present these are not highly stressed.

It has already been pointed out that the proposed dressing tool is suitable for dressing helically ribbed grinding wheels of any desired profile, for instance including globoidal wheels with cycloidal ribbing, and of forming such tools during production.

BRIEF DESCRIPTION OF THE DRAWINGS

Embodiments of the invention will be hereinafter more particularly described with reference to the accompanying drawings in which.

DESCRIPTION OF THE PREFERRED EMBODIMENTS

Figure 1:
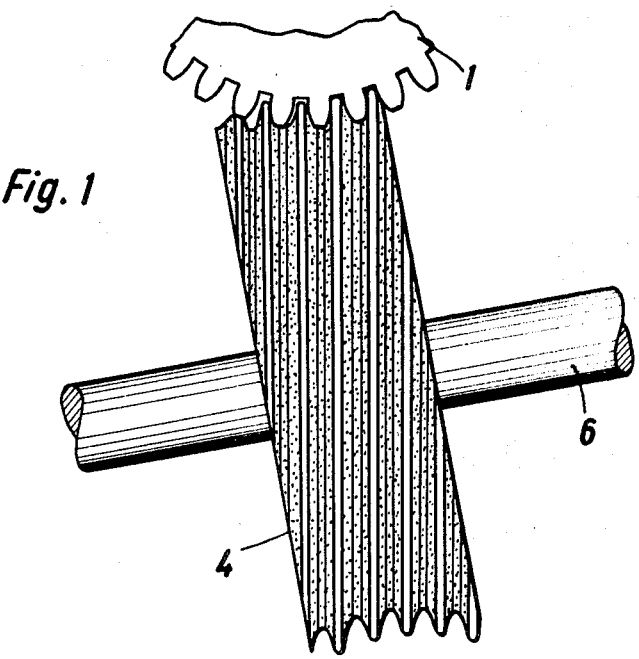
FIG. 1 is a side view of a dressing tool according to the invention with straight axial teeth mating with a helically ribbed grinding wheel.
Figure 2:
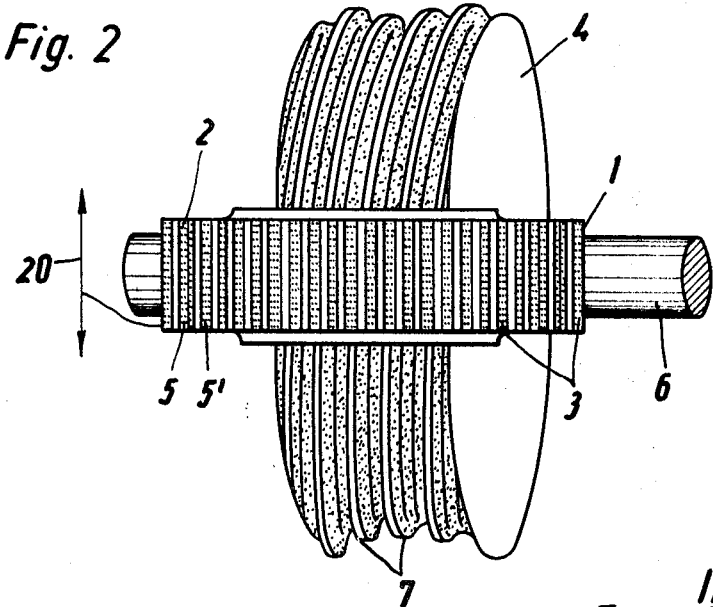
FIG. 2 is a perspective top plan view of the arrangement according to FIG. 1.

FIGS. 1 and 2 show a dressing tool 1 which has the form of a gear wheel with straight axial gear teeth. Diamonds 2 are embedded in the tooth profiles, i.e. in the tooth flanks as well as in the bottom and the crests between the flanks of this gearwheel. As will be understood by reference to FIG. 2 these diamonds 2 are distributed in the tooth flanks in a geometrically defined pattern consisting of parallel rows 3. The position of the rows 3 of diamonds 2 on consecutive tooth flanks 5 and 5' facing the same way differs inasmuch as the rows 3 are relatively staggered so that there is considerable overlap in the action of the diamonds when the dressing tool 1 is in operation.

The teeth of the dressing tool 1 engage the ribs of a helically ribbed grinding wheel 4 which has the form of a globoidal helix. This grinding wheel 4 which is mounted on a shaft 6 revolves together with the dressing tool 1 at a speed which corresponds to that at which a gearwheel not shown in the drawing that is to be ground is rotated. Consequently the tooth flanks of the helically ribbed grinding wheel 4 will be continuously ground and trued by the diamonds 2 on the tooth flanks 5 and 5', the tooth flanks of several ribs of the grinding wheel 4 and hence several teeth of the grinding wheel 4 being ground at the same time. The grinding wheel 4 can therefore be rotated at a fairly high speed and ground with maximum precision, in conformity with the shape of the dressing tool 1 to permit the grinding wheel 4 to be subsequently used for grinding the tooth flanks of the gearwheel. This effect is further improved if the dressing tool 1 is reciprocated in the direction indicated by the double-headed arrow 20 in FIG. 2.

Figure 3:
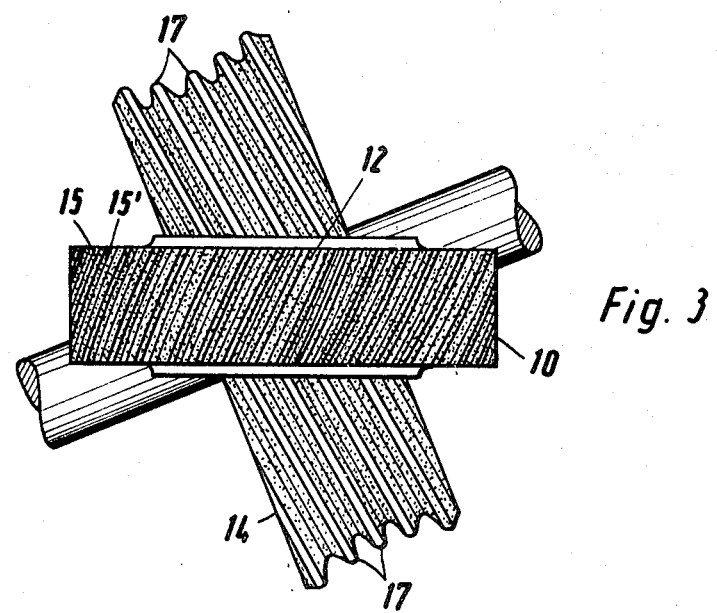
FIG. 3 is a top plan view of a dressing tool with helical teeth mating with a helically ribbed grinding wheel.

Substantially the embodiment illustrated in FIG. 3 differs from the above-described embodiment in that the dressing tool 10 has helically cut gear teeth provided with diamonds 12 which are statistically distributed on the tooth flanks 15 and 15', i.e. located in random distribution. This embodiment likewise has the advantage of permitting several ribs 17 of a helically ribbed grinding wheel 14 to be simultaneously dressed by the action of the diamonds 12 in the tooth flanks 15 and 15'.

Figure 4:
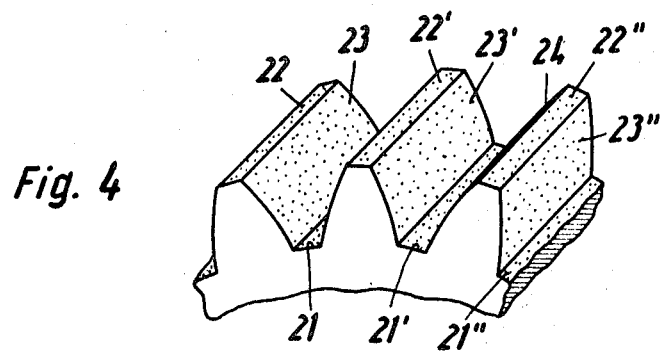
FIG. 4 is a fragmentary perspective view, on an enlarged scale, of a dressing tool containing diamonds in random distribution.

FIG. 4 shows a dressing tool with straight axial gear teeth and it will be seen that in this instance not only the tooth flanks 23, 23', 23'' and 24 are provided with diamonds in random distribution but also the bottom 21, 21', 21'' of each tooth space and the crests 22, 22', 22'' of the teeth.

Figure 5:
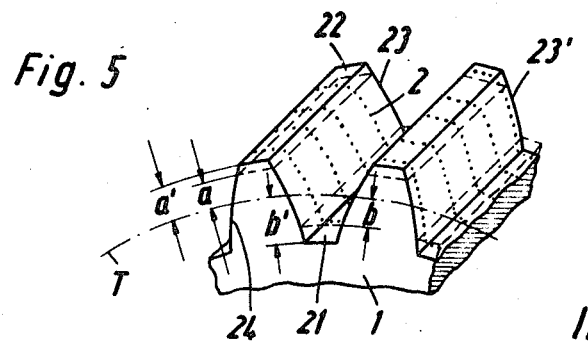
FIG. 5 is a fragmentary view of a dressing tool with diamonds arranged in a geometrically defined pattern.

In the dressing tool 1 in FIG. 5 the addendum $a'$ above the pitch circle T and the dedendum $b'$ exceed the corresponding dimensions $a$ and $b$ of the gearwheel the dressed grinding wheel is intended to grind. These smaller dimensions $a$ and $b$ of the gearwheel, which is not shown, are indicated in discontinuous lines in FIG. 5.

It will further be clear that in this dressing tool the distribution of the diamonds likewise includes the crests 22 of the teeth and the bottoms of the spaces between them, but in this instance the distribution is not random but geometrically regular in rows which are relatively staggered on consecutive tooth flanks 23 and 23' facing the same way.

I claim:

1. A dressing tool in the form of a spur gear for the production and dressing of helically ribbed grinding wheels of the globoidal type for grinding the tooth flanks of spur gears and other profiles that can be generated by rolling, wherein the surfaces of the tooth flanks which form the working surfaces of the dressing tool are provided with diamonds embedded in a matrix, the distribution of diamonds in consecutive tooth flanks facing in either direction being different, whereby the roughness of the surface of the helical ribs on the grinding wheel is minimized.

2. A dressing tool according to claim 1, wherein the addendum of the teeth of the dressing tool is about $1.2 \times m$ and the dedendum is about $1.4 \times m$, whereas the addendum of a gearwheel that is to be ground is about $1.0 \times m$ and the dedendum is about $1.2 \times m$, $m$ being the module of the dressing tool and of the gearwheel that is to be ground with the helically ribbed grinding wheel 3. A method of producing and dressing helically ribbed grinding wheels of the globoidal type for grinding the tooth flanks of spur gears and other profiles which can be generated by a rolling action, comprising the steps of:
   a. rotating a gearwheellike dressing tool having diamonds embedded in the surface of its tooth flanks about an axis,
   b. meshing the dressing tool teeth with a helically ribbed grinding wheel such that only the planar surfaces of the tooth flanks contact the ribs of the grinding wheel, the axis of said grinding wheel being transverse to that of said dressing tool, and
   c. cutting the grain of the rib surfaces of the helically ribbed grinding wheel by rotating said grinding wheel and said dressing tool whereby the surfaces of the tooth flanks of the dressing tool dress the ribs of the grinding wheel.

4. A method as claimed in claim 3, wherein the dressing tool is axially reciprocated across the helically ribbed grinding wheel during the dressing operation.

5. A method as claimed in claim 3, wherein a dressing tool is used the addendum of the teeth of which is about $1.2 \times m$ and the dedendum of which is about $1.4 \times m$ in relation to the addendum of about $1.0 \times m$ and the dedendum of about $1.2 \times m$ of a gearwheel that is to be ground, $m$ being the module of the dressing tool and of the gearwheel that is to be ground with the helically ribbed grinding wheel, and a pertinent root line diameter of the helically ribbed grinding wheel is corrected by means of a diamonds carrying disc after the dressing of said helically ribbed grinding wheel.

6. A dressing tool as set forth in claim 1 wherein the diamonds are embedded in the tooth flanks in a geometrically defined pattern of distribution, the pattern on each consecutive tooth flank facing in either direction being located on the tooth flank at a different position with respect to the next adjacent tooth flank facing in the same direction, whereby there is an overlap in the action of the diamonds on each consecutive tooth flank minimizing the roughness of the surface of the helical ribs on the grinding wheel.